United States Patent [19]

Nakayama et al.

[11] Patent Number: 4,564,724
[45] Date of Patent: Jan. 14, 1986

[54] TERMINAL INTERFACE CONNECTING TERMINAL UNIT HAVING CENTRAL OFFICE LINE INTERFACE TO KEY TELEPHONE SYSTEM

[75] Inventors: Yasunobu Nakayama, Musashino; Yasuji Sato, Hachioji; Shinichi Shibata, Hino, all of Japan

[73] Assignee: Kabushiki Kaisha Toshiba, Japan

[21] Appl. No.: 613,203

[22] Filed: May 23, 1984

[30] Foreign Application Priority Data

May 31, 1983 [JP] Japan .................................. 58-095039

[51] Int. Cl.[4] ............................................. H04M 3/58
[52] U.S. Cl. ................................. 179/2 A; 179/99 M; 179/99 R
[58] Field of Search .......... 179/27 FG, 27 FH, 99 M, 179/99 P, 99 R, 2 A, 2 DP, 27 G, 6.16, 6.17

[56] References Cited
U.S. PATENT DOCUMENTS 4,028,499 6/1977 Houagimyan et al. ........ 179/18 BD
4,381,427 4/1983 Cheal et al. ................... 179/99 M X Primary Examiner—James L. Dwyer
Attorney, Agent, or Firm—Finnegan, Henderson, Farabow, Garrett & Dunner

[57] ABSTRACT

A terminal interface device comprises in-service detector connected to a plurality of CO lines leading to a main unit in a key telephone system and also connected to a terminal unit having a CO line interface, for detecting the in-service state of the respective lines, that is, whether the CO line is currently being used by the terminal unit and for sending an in-service signal indicative of the detected in-service state to the main unit of the system, and a switch controllably operated by a switching control signal generated from the main unit on the basis of the in-service signal and a signal indicative of the state of the CO lines in the main unit to connect one of the plural lines to the terminal unit.

12 Claims, 4 Drawing Figures

TERMINAL INTERFACE CONNECTING TERMINAL UNIT HAVING CENTRAL OFFICE LINE INTERFACE TO KEY TELEPHONE SYSTEM

BACKGROUND OF THE INVENTION

1. Field of the Invention

This invention relates to a terminal interface device provided to additionally connect such a terminal unit having a central office line interface as an answering telephone set, a facsimile equipment, a cordless telephone set or a modem, to a main unit of a key telephone system without further providing a current supply circuit for additional terminal units and ringing signal generators.

2. Description of the Prior Art

There is a key telephone system in which a plurality of key telephones are connected through a main unit to a plurality of central office lines (CO lines). The main unit of such a key telephone system includes telephone interfaces connecting the key telephones to the CO lines, but does not include interfaces connecting between the system and a terminal unit equivalent to a standard telephone set having a central office line interface (CO line interface). For this reason, such a terminal unit as an answering telephone set, a facsimile equipment, a cordless telephone set or modem cannot be connected directly to the main unit of the key telephone system so as to commonly use the CO lines. For overcoming the above problem, such a method has been proposed in which in-service detectors are provided and terminal units with CO line interface are connected through the in-service detectors to each one of the CO lines leading to the main unit of the key telephone system, with the output of the in-service detectors being fed to the main unit. In this method, each terminal unit having the CO line interface must be connected to one of the CO lines in one-to-one correspondence. Accordingly, if a CO line connected to one of such terminal units is being used or serviced by the key telephone system, the terminal unit connected to the CO line cannot be used, that is, a calling from this particular unit cannot be made. When a ringing signal appears on a line other than the line connected to the terminal unit, this terminal unit cannot answer the ringing signal. In case that the terminal unit is an answering telephone, the answering telephone can answer the ringing CO line if the CO line is connected to the telephone but cannot answer other ringing CO lines which are not connected to this particular answering telephone. It is preferable that the answering telephone can exhibit its automatic answering function over all the CO lines connected to the key telephone system. However, according to the above method, the answering telephone cannot answer lines other than the particular one to which the telephone is connected and therefore this method is not preferable to provide an answering telephone as an option in the key telephone system.

As another method for connecting a terminal unit having a CO line interface to a key telephone system, it has been proposed to use a manually operated switch box to selectably connect the terminal unit to any one of plural CO lines. According to this method, switching of the switch box enables the terminal unit to function over all the CO lines leading to the key telephone system. However, in this method, the key telephone system and the terminal unit cannot use a CO line at the same time but must use it alternately. Thus, a "conference state" or a "branch", in which they are connected commonly to the same CO line, cannot be achieved. For this reason, in the event where the terminal unit is a facsimile equipment, key telephones in the key telephone system cannot make originating call for sending data from the facsimile equipment.

SUMMARY OF THE INVENTION

Accordingly, it is an object of the present invention to provide a terminal interface connecting a terminal unit having a CO line interface to a key telephone system, which enables the selective connection of the terminal unit to all the CO lines and also the "conference state" or "branch" of the terminal unit with key telephones of the system.

To achieve the above object, the present invention comprises in-service detecting means connected to a plurality of CO lines leading to a main unit in a key telephone system and also connected to a terminal unit having a CO line interface, for detecting the in-service state of the respective lines, that is, whether the CO line is currently being used by the terminal unit and for sending an in-service signal indicative of the detected in-service state to the main unit of the system, and switching means controllably operated by a switching control signal generated from the main unit on the basis of the in-service signal and a signal indicative of the state of the CO lines in the main unit to connect one of the plural lines to the terminal unit. The terminal unit having the CO interface includes an answering telephone set, a facsimile equipment, a cordless telephone set and a modem which are employed as an option for the key telephone system.

Another object of the present invention is to provide a terminal interface where the terminal units can answer the ringing CO lines even in case of a power failure in the key telephone system. In this case, the terminal interface comprises in-service detecting means connected to a plurality of CO lines leading to the main unit of a key telephone system and also connected through first and second switching means to first and second terminal units having respective CO line interfaces, for detecting the in-service state of the CO lines to be used by the first and second terminal units and for sending an in-service signal indicative of the detected in-service state to the main unit of the system, and ringing detecting means connected to the respective lines through a relay whose contacts are closed when the power of the system is turned off, wherein said first switching means is automatically operated in response to a switching control signal generated from the main unit of the system on the basis of said in-service signal and a signal indicative of the state of the lines in the main unit and said second switching means is manually operated in response to a ringing detection of said ringing detecting means.

According to the present invention, the terminal units having the CO interfaces can be assured in privacy state and selectively connected to the CO lines. Further, a terminal unit of the type requiring a ringing signal from a CO line to start its operation and terminal units having various functions can be employed in the terminal interface device of the invention. That is, with the terminal interface device of the invention, answering telephone sets, facsimile equipment or telephone sets for use in power failure can be connected to the main unit of the key telephone system.

In addition, the device of the invention can make effective use of the function of the terminal unit having the CO line interface, and thus will not require the main unit of the key telephone system to provide such circuits as a bell-signal generating circuit, a D.C. power supply circuit and a dial-signal receiving circuit.

BRIEF DESCRIPTION OF THE DRAWINGS

The above and other objects and advantages of the present invention will become clear from the following description with reference to the accompanying drawings, in which.

DESCRIPTION OF THE PREFERRED EMBODIMENTS

Embodiments of the present invention will be described with reference to the drawings.

Figure 1:
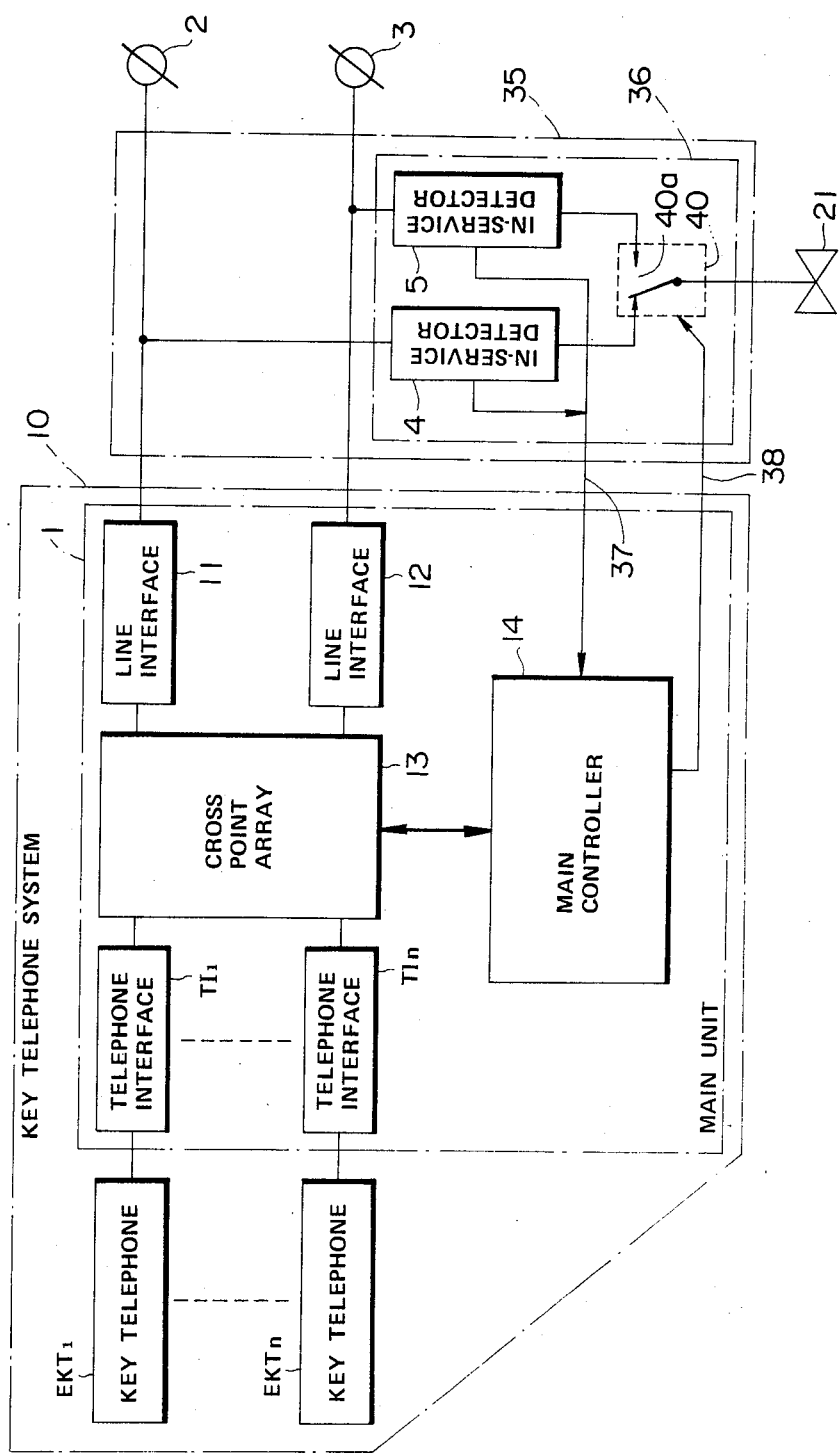
FIG. 1 is a block diagram of a key telephone system connected to a terminal interface device according to an embodiment of the present invention.

Referring to FIG. 1, there is shown a block diagram for explaining how a terminal interface device 36 according to an embodiment of the present invention is connected to a key telephone system 10. More specifically, the terminal interface device 36 connects optionally a terminal unit such as a telephone set 21 having a central office (CO) line interface, to the system 10 which comprises key telephone sets $EKT_1$ to $EKT_n$ and a main unit 1 for controlling the telephone sets. The unit 1 in the key telephone system 10 comprises line interfaces 11 and 12 leading to respective central office (CO) lines 2 and 3, telephone interfaces $TI_1$ to $TI_n$ connected to the respective key telephone sets $EKT_1$ to $EKT_n$, a cross point array 13 for switching between the lines 2, 3 and key telephone sets $EKT_1$ to $EKT_n$ and between the telephone sets, and a main controller 14 for controlling the line interfaces 11, 12 telephone interfaces $TI_1$ to $TI_n$, cross point array 13 and a switching control signal 38 in accordance with an in-service signal 37 to be described later.

In FIG. 1, the CO lines 2 and 3 are connected to in-service detecting circuits 4 and 5, respectively. The detectors 4 and 5 generate the in-service signal 37 and send it to the main unit 1 of the telephone system 10. Between the in-service detectors 4, 5 and telephone set 21, a switch 40 is provided. The switch 40 is of an automatic type which selectively connects the telephone 21 to the in-service detector 4 or 5 according to the switching control signal 38 supplied from the main unit 1. The signal 38 is generated by the main controller 14 of the main unit 1 having a processor therein, and can act to control contacts 40a of the switch 40 differently depending on the function of the telephone 21 (or a facsimile and the like). For example, if the telephone 21 is of an automatic answering type, the main controller 14 of the main unit 1 detects a ringing sent to the CO line 2 or 3 and generates the switching control signal 38, causing the telephone 21 to connect to the in-service detector 4 or 5 so that the ringing signal from the CO line is directly inputted into the answering telephone 21 for activation. When the telephone 21 is of a type requiring an idle line hunting function, the relay contacts 40a is normally kept at such positions as shown by a solid line in FIG. 1 so that, if the telephone 21 is hooked off, a signal indicative of the off-hook state is sent as the in-service signal 37 to the main unit 1. If the CO line 2 is not in service (or if the lines 2 and 3 are both in service), the unit 1 receiving the signal 37 causes no change in the relay contacts 40a, whereas, if the line 2 is in service and the line 3 is not in service, the unit generates the switching control signal 38 and controls the relay contacts 40a so that the telephone 21 is connected to the line 3. When the telephone 21 is of a type requiring the idle line hunting function, on the other hand, a reception of the in-service signal 37 at the main unit 1 will cause no control of the switch 40 with the switching control signal 38 so that the telephone 21 will continue to be connected to the in-service detector 4. As a result, when the line 2 is in service, the telephone 21 can be interruptively connected to the line 2. In this case, it will be appreciated, if a facsimile equipment is used instead of the answering telephone 21, the partner facsimile equipment is called by the key telephone sets $EKT_1$ to $EKT_n$ connected to the main unit 1, whereby facsimile communications can be achieved. Further, in all the above cases, when the telephone 21 is hooked off, the main unit 1 can detect that the telephone 21 is in service on the basis of the inputted in-service signal 37. Therefore, after having detected the in-service state, the main unit 1 can be arranged so as to inhibit any interruptive connection of the key telephone sets $EKT_1$ to $EKT_n$ to the CO line, whereby privacy state can be realized. In this case, if the main unit 1 is arranged so that the telephone 21 can be interruptively connected to the line 2 in service, conference state can be realized. A section 35 enclosed by a chain-dotted line in FIG. 1 may be formed as an external device separated from the main unit 1 or may be formed on a printed circuit board in the unit 1.

Figure 2:
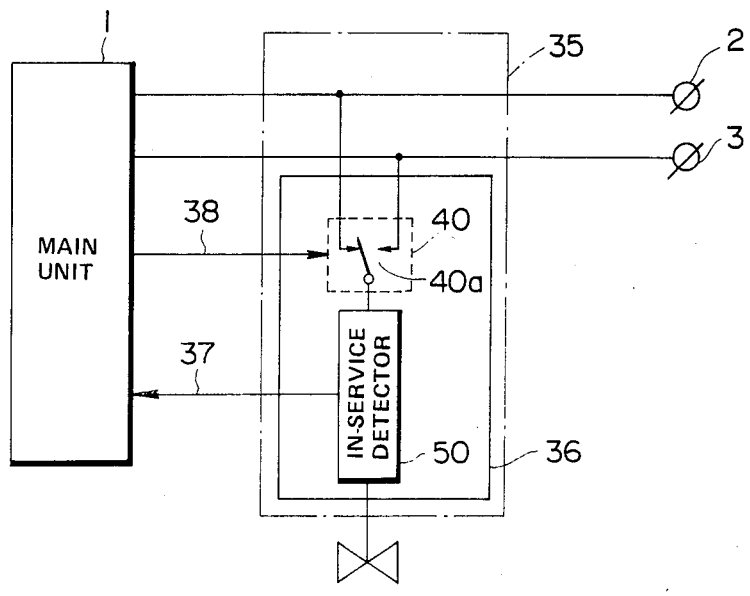
FIGS. 2 and 3 show block diagrams showing other embodiments of the device of the present invention.

FIG. 2 shows a block diagram of another embodiment of the present invention wherein the switch 40 is connected to the CO lines 2 and 3 so that the interconnection of an in-service detecting circuit 50 to the line 2 or 3 is switched according to the switching control signal 38. When compared with the embodiment of FIG. 1, the embodiment of FIG. 2 requires only one in-service detector, which result in that the number of necessary parts and the cost can be reduced.

Figure 3:
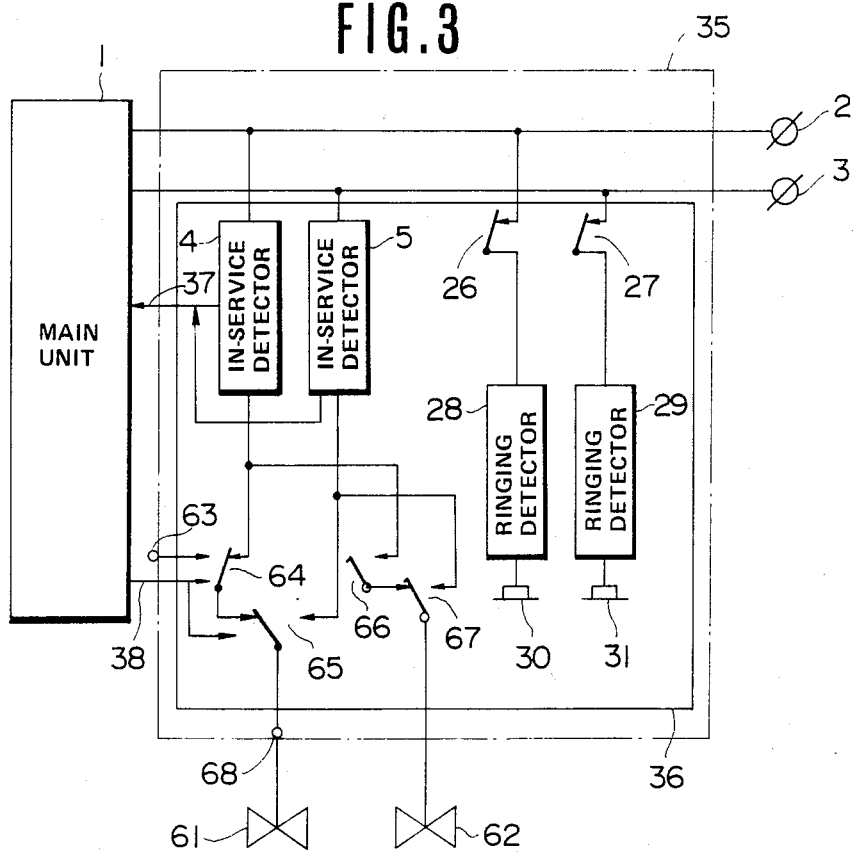

FIG. 3 shows a further embodiment of the present invention wherein the CO lines 2 and 3 are connected respectively to ringing detection circuits 28 and 29 via relay contacts 26 and 27 which are closed when a power supply (not shown) of the main unit 1 is turned off. The ringing detectors 28 and 29 are connected at their opposite sides with sounders 30 and 31 which generate ringing tones, respectively. The ringing detectors 28, 29 and the sounders 30, 31 form ringing detecting means. Further, the in-service detector 4 is connected via manual switches 66 and 67 to a telephone set 62 having a CO line interface, while, the in-service detector 5 is connected via the manual switch 67 to the telephone set 62. A telephone set 61 having a CO line interface is connected to the in-service detector 4 via relay contacts 64 and 65 controlled by the switching control signal 38, and also connected via the relay contact 65 to the in-service detector 5. The relay contacts 64, 65 and switches 66, 67 are the automatic and manual types respectively. Reference numeral 63 is a tandem terminal to be connected to a terminal (corresponding to numeral 68) of a terminal interface (not shown). That is, the telephone 61 is connected via the relay contacts 64 and 65 to the tandem terminal 63.

With such a terminal interface device, if the power supply of the main unit 1 is turned off and the power application to the unit 1 is cut off, for example, due to a power failure, then the relay contacts 26 and 27 are closed so that the ringing detectors 28 and 29 are connected respectively to the lines 2 and 3. At the same time, the relay contacts 64 and 65 are shifted to the illustrated positions. Therefore, the ringing signals from the lines 2 and 3 will cause the sounders 30 and 31 to produce ringing tones. In response to it, an operator for the telephone 61 can answer the ringing line 2 and an operator for the telephone 62 can answer the ringing line 2 or 3 by operating the manual switch 66 and 67. The sounders 30 and 31 may be replaced by proper indicators or, in addition to the sounders, proper indicators may be provided.

With respect to the telephones 61 and 62, as explained in FIGS. 1 and 2, the main unit 1 receiving the in-service signal 37 from the in-service detectors 4 and 5 enables the privacy conversation of the telephones 61 and 62. When the telephone 61 is of an automatic answering type, the telephone 61 can be selectively activated by a ringing signal of the line 2 or 3 from the central office under control of the switching control signal 38 to answer the ringing line. On the other hand, the telephone 62 can be selectively connected to a desired one of the lines 2 and 3 for party calling or reception by switching the manual switches 66 and 67. The telephones 61 and 62 may be interruptively connected to the line 2 or 3 in service, realizing the conference telephone. Further, the telephones 61 and 62 may be replaced with facsimile equipments, as necessary. In the case of the facsimile equipment 61, such a party calling or reception function as explained in FIGS. 1 and 2 can be provided for the facsimile equipment. Whereas, in the case of the facsimile equipment 62, this equipment can be selectively connected to the line 2 or 3 by means of the manual switches 66 and 67 so that the equipment can send data for both of the lines 2 and 3 or so that the equipment is can be connected to either one of the lines 2 and 3 for automatic data reception.

Figure 4:
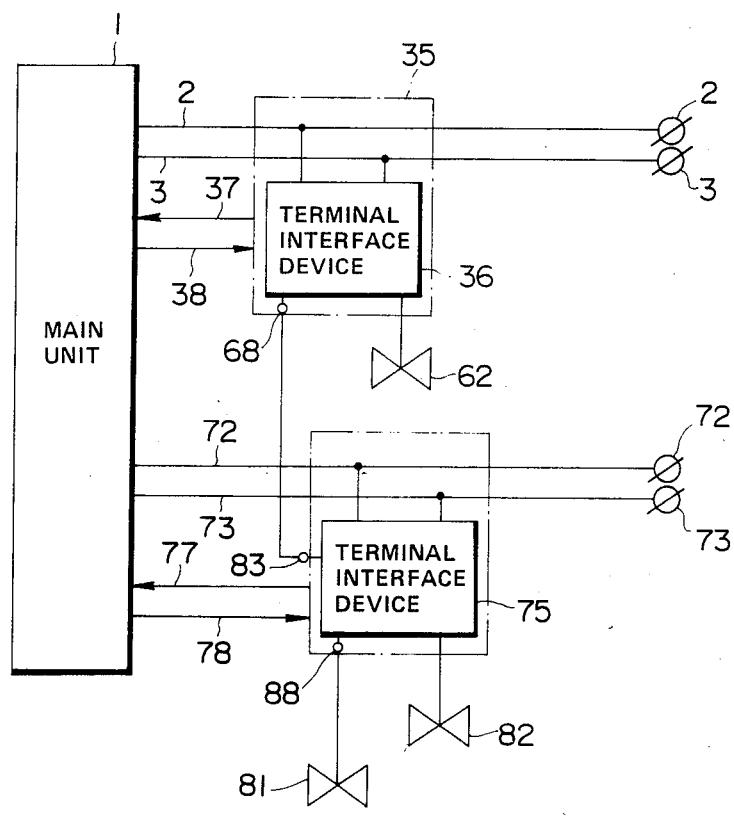
FIG. 4 is a block diagram showing yet another embodiment of the invention wherein two of the device shown in FIG. 3 are arranged in tandem.

Turning to FIG. 4, there is shown yet another embodiment wherein two of the terminal interface devices shown in FIG. 3 are employed. An additional terminal interface device 75 is connected to central office lines 72 and 73, and connected also via a tandem terminal 83 to the terminal 68 of the terminal interface device 36. This allows the telephone 62 to be manually connected to the lines 2 and 3 as well as a telephone 82 to be manually connected to the lines 72 and 73. In addition, a telephone 81 can be selectively connected to the line 72, 73, 2 or 3 by automatic switching means.

In this embodiment, when two units, each having automatic answering function different from each other such as automatic answering telephone set and facsimile equipment, are to be connected, such connection is preferably made as follows. That is, the automatic answering telephone set is provided in place of the terminal unit 81 which is to be connected to CO lines automatically, and the facsimile equipment is provided in place of the terminal unit 82 which is to be connected to CO lines manually. In this case, the facsimile equipment is connected, for example, to the CO line 73. Thus, when ringing takes place in either of the CO lines 2, 3 and 72 during night, the main unit 1 controls switching so as to connect the ringing line to the automatic answering telephone set for answering the ringing. With the above connection, the facsimile equipment can have one dedicated CO line and the automatic answering telephone set can respond to ringing in the rest of the CO lines.

What is claimed is:

1. A terminal interface device for connecting a terminal unit having a central office line interface to a key telephone system comprising: in-service detecting means connected to a selected plurality of central office lines leading to the input terminal of a main unit of said system and also connected to said terminal unit having the central office line interface for detecting the in-service state of said selected respective lines to be used by the terminal unit and for sending an in-service signal indicative of said detected in-service state to said main unit of the system, and switching means controllably switched by a switching control generated from the main unit of the system on the basis of said in-service signal for connecting one of said slected lines to the terminal unit.

2. A terminal interface device as set forth in claim 1, wherein said in-service detecting means are provided between said selected central office lines and said switching means to individually detect the in-service state of selected each line.

3. A terminal interface device as set forth in claim 2, wherein said in-service detecting means detects the presence or absence of a current flowing through a path from said selected office line to said switching means to thereby detect the in-service state of the each selected central office line.

4. A terminal interface device as set forth in claim 1, wherein said in-service detecting means is provided between said switching means and said terminal unit to detect the in-service state of the selected office line to be used by said terminal unit.

5. A terminal interface device as set forth in claim 4, wherein said in-service detecting means detects the presence or absence of a current flowing through a path from said switching means to said terminal unit to thereby detect the in-service state of the selected line to be used by the terminal unit.

6. A terminla interface device as set forth in claim 1, wherein said terminal unit having said central office line interface has an automatic signal-receiving function.

7. A terminal interface device as set forth in claim 6, wherein said terminal unit having said automatic signal-receiving function is an automatic answering telephone set.

8. A terminal interface device as set forth in claim 6, wherein said terminal unit having said automatic signal-receiving function is a facsimile equipment.

9. A terminal interface device connecting a plurality of terminal units having central office line interfaces to a key telephone system, said device comprising in-service detecting means connected to a plurality of central office lines leading to input terminals of a main unit in said system and also connected through first and second switching means to a first and second terminal units of said plurality of terminal units for detecting the in-service state of said lines to be used by the first and second terminal units and for sending an in-service signal indicative of the detected in-service state to said main unit of the system, and ringing detecting means connected to at least one of the plurality of central office lines through relay contacts closed when the power of the system is turned off, wherein said first switching means is automatically switched by a switching control signal generated from the main unit of the system on the basis of said in-service signal and said second switching means is manually switched in response to a ringing detection of said ringing detecting means.

10. A terminal interface device as set forth in claim 9, wherein said first terminal unit is an automatic answering telephone set and said second terminal unit is a facsimile equipment.

11. A terminal interface device as set forth in claim 10, wherein said in-service detecting means are provided for said office lines to individually detect the in-service state of the each line to be used by said first or second terminal unit.

12. A terminal interface device connecting a plurality of terminal units having central office line interfaces to a key telephone system, said device comprising in-service detecting means connected to a plurality of selected central office lines leading to input terminals of a main unit in said system for detecting the in-service state of each of said selected lines to be used by said terminal units and for sending an in-service signal indicative of the detected in-service state to said main unit of the system, first switching means automatically switched so that a first terminal unit having the central office interface is connected to any one of said several lines according to a first switching control signal generated from the main unit of the system on the basis of said in-service signal, ringing detecting means connected to the selected lines through relay contacts closed when the power of the system is turned off, second switching means manually switched so that a second terminal unit having the central office interface is connected to any one of the selected lines, and third switching means switched in response to a second switching control signal from the main unit of the system and connected to a tandem output terminal for connecting said first terminal unit via said first switching means to another office line.

* * * * *